(12) United States Patent
Roziere et al.

(10) Patent No.: US 8,408,058 B2
(45) Date of Patent: Apr. 2, 2013

(54) METHOD OF ESTIMATING THE TRANSVERSE GRIP OF A PAIR OF TIRES BY COMPARATIVE ANALYSIS

(75) Inventors: Jean-François Roziere, Ceyrat (FR); Bruno Perard, Riom (FR); Bertrand Roch, Manglieu (FR)

(73) Assignees: Michelin Recherche et Technique S.A., Granges-Paccot (CH); Compagnie Generale des Establissements Michelin, Clermont-Ferrand (FR)

( * ) Notice: Subject to any disclaimer, the term of this patent is extended or adjusted under 35 U.S.C. 154(b) by 0 days.

(21) Appl. No.: 12/996,617

(22) PCT Filed: Jun. 5, 2009

(86) PCT No.: PCT/EP2009/056935
§ 371 (c)(1),
(2), (4) Date: Mar. 9, 2011

(87) PCT Pub. No.: WO2009/147235
PCT Pub. Date: Dec. 10, 2009

(65) Prior Publication Data
US 2011/0154894 A1      Jun. 30, 2011

(30) Foreign Application Priority Data

Jun. 6, 2008   (FR) .................................... 08 53750

(51) Int. Cl.
*G01M 17/02*   (2006.01)
(52) U.S. Cl. ......................................................... 73/146
(58) Field of Classification Search ............ 73/700–756, 73/146–146.8
See application file for complete search history.

(56) References Cited

U.S. PATENT DOCUMENTS

2002/0029640 A1    3/2002   Shirato et al.

*Primary Examiner* — Andre Allen
(74) *Attorney, Agent, or Firm* — Cozen O'Connor

(57) ABSTRACT

A method of estimating the transverse grip of a pair of tires intended to equip a two-wheeled vehicle by comparative analysis against another pair of tires. The tires are mounted on the vehicle in pairs, the vehicle is run in a circle of set radius until it attains the maximum speed with grip, and the mean speed and/or the mean cornering angle of the vehicle under steady state conditions and/or the mean lap time is/are determined.

11 Claims, 1 Drawing Sheet

Figures 1, 2:
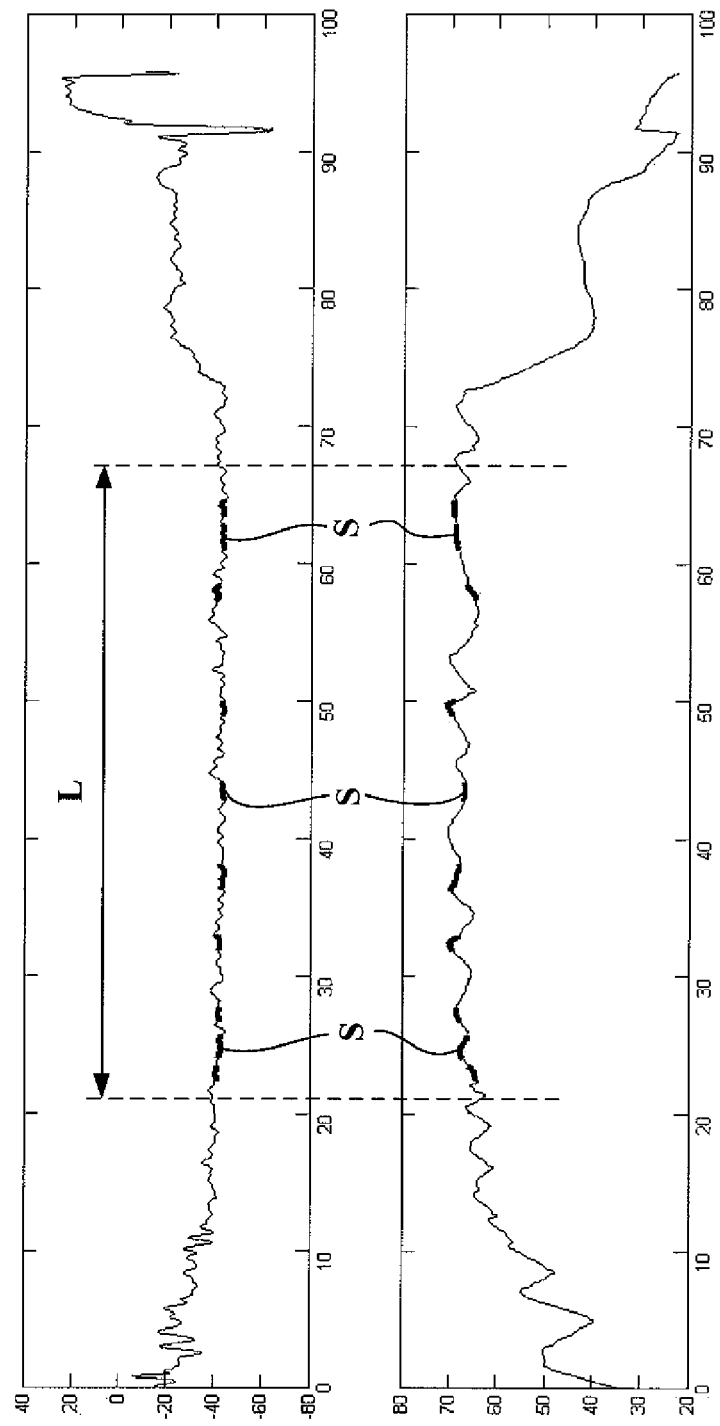

METHOD OF ESTIMATING THE TRANSVERSE GRIP OF A PAIR OF TIRES BY COMPARATIVE ANALYSIS

RELATED APPLICATIONS

This is a U.S. national stage of application No. PCT/EP2009/056935, filed on Jun. 5, 2009.

This patent application claims the priority of French patent application Ser. No. 08/53750 filed Jun. 6, 2008 the disclosure content of which is hereby incorporated by reference.

FIELD OF THE INVENTION

The invention relates to a method of estimating the transverse grip of a pair of tires intended to equip a two-wheeled vehicle using comparative analysis against another pair of tires. Although not limited to this type of application, the invention will be described more specifically with reference to a motorcycle. The invention could be applied to all type of two-wheeled vehicle, whether motorized or not, such as bicycles, scooters, etc.

BACKGROUND OF THE INVENTION

Tire design and development requires the ability to assess the effectiveness of the tires and, in particular, how they behave under running conditions, as objectively as possible. Motorcycle tires are special among other types of tires in that they are used at a relatively high camber angle to allow for cornering.

During such cornering, the transverse grip of the tire is a key parameter that the tire designer wishes to evaluate in order to make progress with tire development.

The present methods for evaluating the transverse grip of a tire involve a subjective assessment by a rider driving a two-wheeled vehicle around a circuit comprising a maximum of bends. These methods allow the tires to be ranked against one another but are in part dependent on the assessment made by the rider and possibly also on the way in which he rides.

SUMMARY OF THE INVENTION

One aspect of the invention is to provide a method that would allow the transverse grip of tires to be evaluated more objectively, the tires being used at a camber angle for the purposes of cornering.

This objective has been achieved according to one aspect of the invention using a method of estimating the transverse grip of a pair of tires intended to equip a two-wheeled vehicle by comparative analysis against another pair of tires, the tires being mounted on the vehicle in pairs, the vehicle being run in a circle of set radius until it attains the maximum speed with grip, and involving determining the mean speed and/or the mean cornering angle of the vehicle under steady state conditions and/or the mean lap time.

The cornering angle of a vehicle corresponds to the angle of inclination of the vehicle. It is advantageously defined by the camber angle of the tire. It may also be defined in terms of an angle formed in a meridian plane, or plane containing the axis of rotation of a tire, between the straight line that passes through the centre of gravity of the vehicle and the point of contact between the tire and the ground. In the case of a vehicle driven by an individual, the centre of gravity considered will advantageously be that of the entity formed of the vehicle and the rider; the build and riding style of the rider will of necessity influence the measured values. Tests conducted have shown that the variations introduced by these factors associated with an individual do not disrupt comparisons between pairs of tires, the induced effects appearing in exactly the same way across all the various pairs of tires.

The angle formed in a meridian plane, or plane containing the axis of rotation of a tire, between the straight line that passes through the centre of gravity of the vehicle or of the vehicle/rider system and the point of contact between the tire and the ground can be determined from the lateral acceleration of the vehicle or of the vehicle/rider system, itself deduced from the speed and the yaw angle measured for example using a GPS (global positioning system) fixed on the vehicle.

The camber angle of a tire is the angle formed by a circumferential plane, or plane perpendicular to the axis of rotation, with the running plane. It may, for example, be measured using two distance sensors, for example laser sensors, mounted a set distance apart on a mount making a set angle with the axis of rotation of the tires, the said sensors measuring the distance between the ground and their respective point of attachment to the mount in a direction perpendicular to the said mount. Measuring the two distances makes it possible to define the camber angle of the tires using simple trigonometric relationships.

The inventors have also been able to demonstrate that the estimating of the transverse grip of tires, in order to be representative of actual use of a two-wheeled vehicle, has to be done on the pair of tires simultaneously, with these tires mounted on a vehicle.

Under steady state conditions, the vehicle is run at its maximum speed with grip, this speed being substantially constant, at a cornering angle that is also substantially constant.

Running a circle makes it easier to obtain a steady state condition. Furthermore, because the radius of the circle is set, this will make it easier for the vehicle equipped successively with different pairs of tires to be run under near-identical ground conditions, with the vehicle always following substantially the same line.

The method is advantageously implemented successively using the various pairs of tires that are to be compared over a period that is as short as possible so that all the parameters external to the vehicle and to the tires, such as weather conditions for example, remain constant.

For preference, according to an embodiment of the invention, under steady conditions, the cornering angle does not vary by more than 3° or the speed by more than 2 km/h over a period ranging between 1 and 5 seconds. Beyond these levels of speed and/or cornering angle variations, the inventors consider that the vehicle is no longer in a sufficiently steady state for the speed and cornering angle data acquisition to be relevant to estimating transverse grip.

The method thus described according to an embodiment of the invention determines at least one of the parameters—mean speed or mean cornering angle—under steady state conditions or alternatively the mean lap time, along a given line so as to allow pairs of tires to be compared in terms of their transverse grip.

Any one of these parameters allows the transverse grip to be estimated by comparing the pairs of tires.

According to one preferred embodiment of the invention, at least two of these parameters are determined in order to refine the accuracy of the estimate.

For preference also, at least the mean speed and the mean cornering angle are determined under steady state conditions, these, according to the conditions under which the method is implemented and because the said parameters are determined under steady state conditions, being more accurate than determining the mean lap time.

According to one advantageous embodiment of the invention, the mean speed and the mean cornering angle are determined from at least eight and preferably at least ten periods under steady conditions. Tests conducted have shown that the measurements taken over at least eight periods under steady state conditions make it possible to obtain a statistical image of the mean value of the speed and of the cornering angle that will allow satisfactory comparisons to be made between pairs of tires.

The number of periods under steady state conditions measured is advantageously fewer than fifteen so that the overall running time of the vehicle is not too great notably in order not to cause an increase in tire temperature that could lead to significant variations in the properties of the tire.

According to one preferred embodiment of the invention, the vehicle is run until it reaches the maximum speed with grip, by a rider. It is in fact conceivable to provide a mechanical device that operates and steers the vehicle and is able to achieve the maximum speed with grip on a circle of set radius and then keeps the vehicle running under steady state conditions at the said speed. However, studies have shown that while the speed thus determined could then be stabilized over longer periods, the time taken to determine the maximum speed with grip is very long and varies with the tires for a given set up of the said mechanical device. This lengthy time taken to determine the maximum speed with grip accordingly leads to changes in state of the tire as the tire heats up. Because the time taken to determine the maximum speed with grip can vary from one pair of tires to another, the objectivity of the measurement would be diminished. The inventors have thus demonstrated that having a rider drive the vehicle makes it possible to arrive at the maximum speed with grip more rapidly and in times which are very similar to one another regardless of the tire pairs tested. It is thus possible to make the estimate of the transverse grip of the tires as objective as possible, the tires not having been run for too lengthy a period and the periods for which they have been run also being substantially equivalent to one another regardless of what pair of tires has been fitted to the vehicle.

Advantageously also according to an embodiment of the invention, the radius of the circle on which the vehicle is run ranges between 25 and 90 meters. This range of radius values will allow the transverse grip of pairs of tires to be estimated at speeds ranging between 60 and 120 km/h so that they correspond at best to actual use of the vehicle, notably in the case of a motorcycle.

More preferably still according to an embodiment of the invention, the radius of the circle on which the vehicle is run is less than 40 meters. Such radius values will, on the one hand, make it possible to limit the maximum speed with grip so that risks to the rider are limited. Also, and again for safety reasons, the method is advantageously implemented on a track surrounded by an obstacle-free run-off area that is extensive enough that the rider cannot hit anything in the event of an accident. It is therefore preferable to limit the radius of the circle on which the vehicle is run in order to be able to find such a track.

According to one advantageous embodiment of the invention, the surface covering of the circle on which the vehicle is run has a grip number ranging between 0.3 and 0.8. Advantageously also, the grip number ranges between 0.5 and 0.6 in order to correspond to grip levels similar to those of the roads on which the vehicles are likely to run.

The grip number (GP) is measured under dampened conditions using a Findlay/Irvine Grip Tester MK II.

According to an advantageous embodiment of the invention, the cornering angle and/or the speed of the vehicle is/are continuously recorded while the vehicle is running, periods of steady state conditions are determined, a mean cornering angle and/or a mean speed of the vehicle is/are determined for each of the periods under steady state conditions, and a statistical mean of the cornering angle and/or of the speed of the vehicle across all the periods under steady state conditions is taken.

Advantageously also, the means of the cornering angles and/or the speeds of the vehicle are compared statistically for two pairs of tires in order to determine which pair of tires has the best transverse grip and rank pairs of tires against one another.

BRIEF DESCRIPTION OF THE SINGLE DRAWING

Further details and advantageous features of the invention will emerge hereafter from the description of one embodiment of the invention given with reference to the figure which illustrates a recording of the measurements taken.

DETAILED DESCRIPTION OF A PREFERRED EMBODIMENT OF THE INVENTION

The method was implemented by successively equipping a motorcycle with six pairs of tires in order to rank their relative transverse grip.

The motorcycle was a Honda 600 CBR, with standard factory settings.

The pairs of tires were 120/70 ZR 17 on the front wheel and 180/55 ZR 17 on the back wheel.

The motorcycle was equipped with a system of two distance sensors attached to a mount as described previously for determining the camber angle of the tires. The two sensors operate by optical triangulation using a class 3a laser and are marketed by Optimess under the reference Optima 356HPV.

To measure speed, the motorcycle was equipped with a dynamic GPS module marketed by 2D Meβsysteme Gmbh under the reference Dynamic GPS module.

The track on which the method was implemented had a radius of 30 meters. For practical purposes, two lines were marked out on the ground. These were two circles concentric with the reference circle on which the motorcycle was to lap, marking out a running strip of a width substantially equal to about 50 centimeters. This strip allowed the rider to ensure that he was riding around the preset circle.

The rider, an experienced professional, started with the motorcycle on the circular track and allowed himself two laps of the circuit in order to be able to define the maximum speed with grip. Measurements were then taken over six laps so as to be able to acquire ten or so periods of at least one second corresponding to steady state conditions.

As explained earlier, the steady state conditions according to the invention were defined by a speed varying by no more than 2 km/h and a camber angle varying by no more than 3°.

The measurements were recorded throughout the time the motorcycle spent on the circuit.

The figures illustrate the recordings obtained in terms of the camber angle of the motorcycle in FIG. 1, and in terms of the speed of the motorcycle in FIG. 2. The abscissa axis shows the running time and the ordinate axis shows the value of the camber angle in FIG. 1, and the value of the speed expressed in km/h in FIG. 2.

The running time needed to take the measurements for one pair of tires, including the time for the first two laps that allow the rider to define the maximum speed with grip, was 75 seconds. This running time corresponds to a distance of 1130 meters covered by the tire. This time and this distance needed for measurement purposes are low enough that the properties of the tire are not altered during the running. Also, they give the possibility of being able to obtain at least eight periods of at least one second under steady state conditions.

The period L of the six laps of measurements was then identified and zones S corresponding to periods under steady state conditions as defined above were then sought. These periods S are indicated in the figures by a thickening of the line; in FIGS. 1 and 2, ten periods S under steady state conditions have been identified.

Across each of the periods S, a mean was taken in order to define a mean camber angle and then a statistical mean was taken across all of the ten periods identified.

These various stages in the processing of the measured signals may of course be carried out using computerized tools to facilitate and speed up the processing. Such a computerized tool may, for example, be software of the Matlab type.

When the vehicle has been run and the recorded signals had been processed for the various pairs of tires, it was possible to make statistical comparisons in order to rank the pairs of tires against one another in terms of transverse grip. This statistical comparison can also be carried out using computerized tools such as Matlab or Excel.

The miming and measurements taken allowed the six pairs of tires tested on the motorcycle to be ranked with no ambiguity whatsoever.

Other tests were carried out on the same pairs of tires mounted on the same motorcycle ridden by other riders, again professional riders. The results obtained demonstrated values that differed substantially in terms of the speeds and camber angles measured, and these differences can be explained by effects associated with the build, in terms of the different sizes and weights, of the riders or with the relative abilities of the riders to ride at the limit of grip. By contrast, the comparative ranking of the pairs of tires in terms of transverse grip was maintained with no ambiguity in the interpretation of the results.

This type of test was carried out both on dry ground and on wet ground. In both instances, the method for estimating the transverse grip of a pair of tires proved entirely suitable.

The invention claimed is:

1. A method of estimating the transverse grip of a pair of tires intended to equip a two-wheeled vehicle by comparative analysis against another pair of tires, wherein the tires are mounted on the vehicle in pairs, wherein the vehicle is run in a circle of set radius until it attains the maximum speed with grip, and wherein the mean speed and/or the mean cornering angle of the vehicle under steady state conditions and/or the mean lap time is/are determined.

2. The method according to claim 1, wherein, under steady conditions, the cornering angle does not vary by more than 3° or the speed by more than 2 km/h over a period ranging between 1 and 5 seconds.

3. The method according to claim 1, wherein the mean speed and the mean cornering angle are determined from at least eight and preferably at least ten periods under steady conditions.

4. The method according to claim 1, wherein the mean speed and the mean cornering angle are determined from fewer than 15 periods under steady conditions.

5. The method according to claim 1, wherein the vehicle is run until it reaches the maximum speed with grip, by a rider.

6. The method according to claim 1, wherein the radius of the circle ranges between 25 and 90 meters and is preferably less than 40 meters.

7. The method according to claim 1, wherein the surface covering of the circle has a grip number ranging between 0.3 and 0.8.

8. The method according to claim 1, wherein the cornering angle and/or the speed of the vehicle is/are continuously recorded while the vehicle is running, wherein periods of steady state conditions are determined, wherein a mean cornering angle and/or a mean speed of the vehicle is/are determined for each of the periods under steady state conditions, and wherein a statistical mean of the cornering angle and/or of the speed of the vehicle across all the periods under steady state conditions is taken.

9. The method according to claim 8, wherein the means of the cornering angles and/or the speeds of the vehicle are compared statistically for two pairs of tires.

10. The method according to claim 1, wherein the vehicle is a motorcycle.

11. The method according to claim 1, wherein the surface covering of the circle has a grip number ranging between 0.5 and 0.6.

* * * * *